United States Patent
Franze et al.

(10) Patent No.: US 11,157,065 B2
(45) Date of Patent: Oct. 26, 2021

(54) LOW-ENERGY OPERATION OF MOTOR VEHICLE FUNCTIONS DURING THE OPERATION OF THE MOTOR VEHICLE

(71) Applicants: Bayerische Motoren Werke Aktiengesellschaft, Munich (DE); Siemens Industry Software Inc., Wilsonville, OR (US)

(72) Inventors: Daniel Franze, Neuss (DE); Hans-Peter Reichert, Dotternhausen (DE); Georg Spoerlein, Schopfloch (DE); Reiner Striebel, Reichenau (DE)

(73) Assignees: Bayerische Motoren Werke Aktiengesellschaft, Munich (DE); Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/472,659

(22) PCT Filed: Dec. 20, 2017

(86) PCT No.: PCT/DE2017/000430
§ 371 (c)(1),
(2) Date: Jun. 21, 2019

(87) PCT Pub. No.: WO2018/113812
PCT Pub. Date: Jun. 28, 2018

(65) Prior Publication Data
US 2019/0361515 A1    Nov. 28, 2019

(30) Foreign Application Priority Data
Dec. 23, 2016  (DE) ............ 10 2016 015 511.6

(51) Int. Cl.
*G06F 1/3287* (2019.01)
*G06T 1/20* (2006.01)
(Continued)

(52) U.S. Cl.
CPC ............ *G06F 1/3287* (2013.01); *B60R 16/03* (2013.01); *G01C 21/3667* (2013.01);
(Continued)

(58) Field of Classification Search
CPC ....... B60R 16/03; G06T 1/20; G01C 21/3667; G09G 5/36; G09G 2330/021;
(Continued)

(56) References Cited

U.S. PATENT DOCUMENTS

2009/0096797 A1* 4/2009 Du ..................... G06F 1/3203
345/506
2009/0306890 A1* 12/2009 Yoshida ............... G01C 21/005
701/423
(Continued)

FOREIGN PATENT DOCUMENTS

DE   10 2015 106 318 A1   10/2016
JP      2010-117289 A      5/2010
(Continued)

OTHER PUBLICATIONS

International Search Report (PCT/ISA/210) issued in PCT Application No. PCT/DE2017/000430 dated Apr. 25, 2018 with English translation (six (6) pages).
(Continued)

*Primary Examiner* — Jacinta M Crawford
(74) *Attorney, Agent, or Firm* — Crowell & Moring LLP

(57) ABSTRACT

A method is provided for electric low-energy operation of motor vehicle functions during the operation of a motor vehicle equipped with an information display. The method deactivates the information display of the motor vehicle; degrades a functionality of at least one vehicle component that uses the information display to visually represent specific information of the vehicle component; and deactivates a graphics processing unit of the motor vehicle as an
(Continued)

energy-saving measure. The graphics processing unit is configured to prepare the specific information of the vehicle component such that this information can be visually represented on the information display. The functionality of the vehicle component is degraded such that the vehicle component continues to determine its associated specific information in accordance with the function and keep the information ready in a prepared manner for graphical processing.

19 Claims, 7 Drawing Sheets

(51) Int. Cl.
*B60R 16/03* (2006.01)
*G01C 21/36* (2006.01)
*G06F 1/3218* (2019.01)
*G06F 1/3231* (2019.01)
*G06F 1/324* (2019.01)
*G06F 1/3234* (2019.01)
*G09G 5/36* (2006.01)

(52) U.S. Cl.
CPC ............ *G06F 1/324* (2013.01); *G06F 1/3218* (2013.01); *G06F 1/3231* (2013.01); *G06F 1/3243* (2013.01); *G06F 1/3265* (2013.01); *G06T 1/20* (2013.01); *G09G 5/36* (2013.01); *G09G 2330/021* (2013.01); *G09G 2380/10* (2013.01)

(58) Field of Classification Search
CPC . G09G 2380/10; G06F 1/3218; G06F 1/3231; G06F 1/324; G06F 1/3243; G06F 1/3265; G06F 1/3287

USPC ........................................................ 345/501
See application file for complete search history.

(56) References Cited

U.S. PATENT DOCUMENTS

| | | | | |
|---|---|---|---|---|
| 2012/0306923 | A1* | 12/2012 | Boschker | G01C 21/36 345/634 |
| 2013/0057573 | A1* | 3/2013 | Chakravarthula | G06F 3/005 345/619 |
| 2014/0248863 | A1* | 9/2014 | Golsch | H02J 7/025 455/418 |
| 2015/0089260 | A1* | 3/2015 | Tsutsui | G06F 1/263 713/322 |
| 2015/0116336 | A1* | 4/2015 | Yoshimura | B60R 11/02 345/520 |
| 2016/0334853 | A1* | 11/2016 | Ono | G06F 1/3212 |

FOREIGN PATENT DOCUMENTS

| | | |
|---|---|---|
| JP | 2011-128341 A | 6/2011 |
| WO | WO 2016/169910 A1 | 10/2016 |

OTHER PUBLICATIONS

German-language Written Opinion (PCT/ISA/237) issued in PCT Application No. PCT/DE2017/000430 dated Apr. 25, 2018 (five (5) pages).

German Search Report issued in counterpart German Application No. 10 2016 015 511.6 dated Nov. 28, 2017 with partial English translation (14 pages).

\* cited by examiner

LOW-ENERGY OPERATION OF MOTOR VEHICLE FUNCTIONS DURING THE OPERATION OF THE MOTOR VEHICLE

BACKGROUND AND SUMMARY OF THE INVENTION

The present invention relates to an electrical low-energy operation of motor vehicle functions during the operation of the motor vehicle.

In the context of increasingly complex functions of infotainment systems and the accompanying increasing energy consumption of such systems, it is necessary to take countermeasures in order to reduce energy consumption. By virtue of corresponding measures, it is possible for example firstly to increase the range of E-vehicles and secondly to reduce the CO2 emissions of conventional vehicles.

At the present time, infotainment data are determined in what is known as a head unit of the motor vehicle and depicted visually on an information display. If the information display is not required by the vehicle user, said user is able to switch it off. In this case, however, the information display is just switched to black, and it therefore remains activated and all of the information to be displayed, such as for example a current radio station list for example in the case of using a digital radio, or a current navigation map in the case of using a vehicle navigation system, continue to be calculated and depicted visually on the information display. Since the display is switched to black, the user is unaware of this. By virtue of this, it is possible, at the time at which the vehicle user activates the information display again, for the up-to-date information to be immediately visually depicted on the information display in visible form. However, this leads to a high energy consumption in the display, in the processors of the head unit and also in vehicle functions or vehicle systems that process information for the processors of the head unit.

It would therefore be desirable to provide an option for correspondingly reducing the electrical energy consumption for the case in which the information display is not required by the user during use of the motor vehicle.

There is therefore needed an option that avoids or at least reduces at least some of the disadvantages known in the prior art.

This need is met by a method for an electrical low-energy operation of motor vehicle functions during the operation of a motor vehicle. In this case, the motor vehicle comprises an information display. And the method comprises: deactivating the information display of the motor vehicle; downgrading a functionality of at least one vehicle component that uses the information display to visually depict specific information of the vehicle component; and, deactivating a graphics processing unit of the motor vehicle as an energy-saving measure. In this case, the graphics processing unit is configured so as to prepare the specific information of the vehicle component such that this information is able to be depicted visually on the information display. And in this case, the functionality of the vehicle component is downgraded such that the vehicle component continues to functionally determine its associated specific information and retains it in preparation for a graphic processing operation.

Method steps may in this case be executed automatically by way of a suitable automation device.

An information display within the meaning of the invention in this case means an electronic display device for depicting visual graphic content. The electronic display device preferably has a multiplicity of color options and an expedient number of pixels such that a vehicle user is able to clearly read both text information and graphically complex information, such as for example a navigation map. The electronic display device preferably has a screen diagonal of at least 5 inches.

Deactivating the information display within the meaning of the invention in this case means switching off the information display. The deactivation preferably takes place such that the information display is quickly available again upon renewed use.

This may be ensured for example by virtue of the fact that a specific standby pin is provided on the display controller that is accordingly able to be activated so as to be able to operate or drive the information display accordingly with low power consumption. To this end, a separate voltage level or electrical line may be provided. The information display is thus able to be switched off and is able to be activated again quickly.

A vehicle component within the meaning of the invention in this case means a device, a system and/or software that provides specific information that is able to be depicted on the information display following graphic preparation. In this case, the specific information is rendered, so as then to be able to depict it appropriately on the information display, in a graphics processing unit (GPU), which is generally not part of the vehicle component itself.

Specific information of the vehicle component of the motor vehicle within the meaning of the invention in this case means information which, when prepared appropriately, is able to be depicted visually on an information display in order to be able to display, to the vehicle user, that information that he expects and/or may expect from a corresponding functionality of this vehicle component. The specific information is in particular information from the vehicle infotainment field.

A graphics processing unit within the meaning of the invention in this case means a device that is configured so as to render digital information to be depicted, so as then to be able to depict said information on the digital information display. In general, such a device is also abbreviated to "GPU", since it constitutes a specialized form of a CPU.

Retention in preparation for a graphic processing operation within the meaning of the invention in this case means that the corresponding specific information are prepared such that they are able to be used immediately at any time for a graphic depiction when needed and, for this purpose, are retained in a computer data memory, also called RAM, wherein only the last processing steps need to be performed by the GPU and possibly by a signal converter.

The teaching according to the invention achieves the advantage that consumers of electrical energy of the infotainment system of the motor vehicle are able to be switched off in a targeted manner in order to save electrical energy, as long as these are not used by a vehicle user during use of the vehicle, without the infotainment functionalities expected by the vehicle user when needed having to be restarted and initialized.

This need is further met by a device for an electrical low-energy operation of motor vehicle functions during the operation of a motor vehicle. In this case, the motor vehicle comprises an information display. And in this case, the device comprises: a deactivation module for deactivating the information display of the motor vehicle; a downgrading module for downgrading a functionality of at least one vehicle component that uses the information display to visually depict specific information of the vehicle component; and, a deactivation module for deactivating a graphics processing unit of the motor vehicle as an energy-saving measure, wherein the graphics processing unit is configured so as to prepare the specific information of the vehicle component such that this information is able to be depicted visually on the information display. And in this case, the device is configured so as to execute a method according to the invention.

The teaching according to the invention achieves the advantage that a device is able to be provided that allows consumers of electrical energy of the infotainment system of the motor vehicle to be switched off in a targeted manner in order to save electrical energy, as long as these are not used by a vehicle user during use of the vehicle, and in this case ensure that the expected infotainment functions are immediately available in updated form when needed.

The need is still further met by a motor vehicle. The motor vehicle comprises a vehicle component. In this case, the vehicle component is configured so as to provide specific information. The motor vehicle furthermore comprises an information display. In this case, the information display is configured so as to graphically depict the specific information of the vehicle component. And, the motor vehicle furthermore comprises a device according to the invention. And in this case, the motor vehicle is configured so as to execute a method according to the invention.

The teaching according to the invention achieves the advantage that it is possible to provide a motor vehicle that allows consumers of electrical energy of the infotainment system of the motor vehicle to be switched off in a targeted manner in order to save electrical energy, as long as these are not used by a vehicle user during use of the vehicle, and in this case ensure that the expected infotainment functions are immediately available in updated form when needed.

A computer program product for a device and/or a motor vehicle that is able to be operated in accordance with a method according to the invention is also disclosed.

The teaching according to the invention achieves the advantage that the method is able to be executed automatically in a particularly efficient manner.

A data carrier comprising any computer program product according to the invention is also disclosed.

The teaching according to the invention achieves the advantage that the method is able to be distributed or kept on the devices, systems and/or motor vehicles executing the method in a particularly efficient manner.

Before configurations of the invention are described in more detail below, it should first of all be stated that the invention is not restricted to the described components or the described method steps. Furthermore, the terminology that is used does not constitute a restriction, but is rather merely exemplary in nature. To the extent that the singular is used in the description and the claims, this is also understood to incorporate the plural, provided that the context does not explicitly exclude this. Any method steps may be executed automatically, provided that the context does not explicitly exclude this. Corresponding method sections may lead to corresponding device properties, and vice versa, such that it is made possible to change a method feature into a device feature, and vice versa, provided that the context does not explicitly exclude this.

Further exemplary configurations of the method according to the invention are explained below.

According to a first exemplary configuration, the method comprises the feature that the specific information is retained, in preparation for a graphic processing operation, such that the specific information is able to be rendered immediately for the visual depiction on the information display when needed.

Retention in preparation for the graphic processing operation within the meaning of the invention in this case means that the corresponding specific information is prepared such that it is able to be transmitted at any time to the GPU for immediate rendering when needed.

The rendered data then only need to be fed into a graphic pipeline and possibly also be converted for example from HDMI into LVDS by way of a signal converter for immediate depiction on the information display. Filling the graphic pipeline in this case generally lasts just a few microseconds to a few milliseconds.

The rendering of the specific information may in this case take place within milliseconds.

In the deactivated mode of the information display, it may therefore be expedient to communicate to rendering applications that rendering is no longer taking place on the GPU, due to which it is no longer necessary to fill the pipeline, and the pipeline is able to be kept empty.

The signal converter may in this case be for example what is known as an IF component. If such a signal converter is required, then it may also be kept in a standby mode in the deactivated mode of the information display, for example, in order to save further electrical energy.

This configuration has the advantage that up-to-date information is available as visual information immediately after the information display is switched on or activated again.

According to a further exemplary configuration, the method furthermore comprises monitoring the information display such that the information display is deactivated if the monitoring reveals that the information display is not being used.

It is therefore not necessary to wait to deactivate or switch off the information display, but rather the motor vehicle may itself establish whether the information display is currently not being used and deactivate it itself. This may be established for example by observing the behavior, such as for example the eye movements, of the vehicle user. Furthermore, this may also be established by virtue of the fact that the infotainment system has not currently received any task from the vehicle user.

This configuration has the advantage that even more electrical energy is thereby able to be saved during use of the vehicle.

According to a further exemplary configuration, the vehicle component comprises a navigation device, and the specific information comprises navigation map information.

This refinement has the advantage that the invention is able to be applied to applications of the infotainment system that are computationally intensive and frequently used by the vehicle user, in order to save electrical energy.

According to a further exemplary configuration, the vehicle component has a radio transmitter device, and the specific information comprises radio station information.

This configuration has the advantage that the invention is able to be applied to applications of the infotainment system that are used very often by the vehicle user and in which it is easily possible to dispense with visual depictions in the information display, in order to save electrical energy.

According to a further exemplary configuration, the method furthermore comprises the feature that downgrading the functionality of the vehicle component comprises limiting an electric power consumption of the vehicle component as a further energy-saving measure.

In this case, it may be analyzed which functions of a vehicle component should currently be used to what extent, without the information display being switched on. Depending on the result of the analysis, functions that are not currently being used may then for example be turned off or switched into a low-energy mode or standby mode, provided that this is technically possible and expedient for the specific application. By contrast, functions that are currently still being used may be curtailed according to their usage requirement, if this is technically possible and expedient for the specific application.

This configuration has the advantage that even lower electrical energy consumption of the infotainment system is possible during use of the vehicle.

According to a further exemplary configuration, the method furthermore comprises the feature that limiting the electric power consumption of the vehicle component comprises a limitation of at least 50% of the electric power consumption of normal operation of the vehicle component.

This configuration has the advantage that even lower electrical energy consumption of the infotainment system is possible during use of the vehicle.

According to a further exemplary configuration, the method furthermore comprises limiting an electric power consumption of a computer device of the motor vehicle as a third energy-saving measure, such that a clock frequency of a computer processor unit of the computer device is curtailed by at least 50%, preferably by at least ⅔.

The electric power saving brought about by a low-power mode according to the invention of the infotainment system or a deactivated mode of the information display is thereby able to be significantly increased. The electric power consumption of an SoC may in this case be reduced for example from around 14 W to around 3 W. By way of example, an overall current infotainment system consumption may be reduced from around 40 W at present to around 14 W.

This configuration has the advantage that an even more significantly lower electrical energy consumption of the infotainment system is possible during use of the vehicle.

According to a further exemplary configuration, the method, when the information display is switched on again, furthermore comprises: canceling any energy-saving measure according to the method; rendering the specific information retained for the graphic processing operation; and, visually depicting the rendered specific information on the information display.

This configuration has the advantage that the information display, after being activated again, is available again with updated visual information as quickly as possible.

According to a further exemplary configuration, the method furthermore comprises the feature that each energy-saving measure according to the method takes place such that it is imperceptible to a user of the motor vehicle.

This configuration has the advantage that the acceptance of the energy-saving measure service in the infotainment field by the vehicle user is able to be significantly increased.

A further advantage is that the use of this energy-saving measure service by the vehicle user is able to be significantly increased.

According to a first exemplary configuration, the device furthermore comprises a computer device. The computer device in this case comprises: an operating system device, a computer data memory and a computer processor unit. In this case, the operating system device comprises an operating system of the computer device. The computer data memory is configured so as to keep stored specific information associated with the vehicle component and in preparation for a graphic processing operation. And the computer processor unit is configured so as to control the device.

The computer device within the meaning of the invention may be for example what is known as a system-on-chip device, also called SoC, as are often used in embedded systems. In this case, an operating system may already be kept on an integrated circuit, what is known as an IC. This may generally be amended externally through updates and/or upgrades.

By way of example, what is known as an LGA in the form of a computer device or in the form of part of the computer device may comprise the SoC and the computer data memory, generally what is known as a random access memory, also called "RAM".

Power management on the SoC may be set using corresponding drivers. As a result, the SoC may control itself using a dedicated voltage supply control logic unit. Such power management may be performed for example by way of a power microcontroller, what is known as a pMiC.

The SoC may thus be put into a low-power mode using a corresponding signal.

The SoC thus uses software to inform the pMiC of the voltage levels that the SoC or the computer device still requires. This may be provided by way of example by way of an inherent logic unit in the SoC.

This configuration has the advantage that it is possible to use a particularly inexpensive industrial device in order to technically implement the energy-saving measures according to the invention, also called energy-saving service according to the invention.

According to a further exemplary configuration, the computer device of the device furthermore comprises the graphics processing unit of the vehicle.

Even more chips may furthermore be present on or incorporated into the computer device in the form of what is known as a system-in-package, called SiP.

This configuration has the advantage that this particularly inexpensive industrial device, also called "embedded system" or "embedded solution", is also able to be used for other calculations for the infotainment system, other than graphic calculations.

Meanwhile, yet more components are often installed in the motor vehicle, such as for example Ethernet and Wi-Fi. Although Ethernet still has to remain active in the deactivated mode of the information display, for example, since it is still used, it may be the case that Wi-Fi is no longer used and is therefore likewise able to be switched off in order to save even more electrical energy.

The power consumption of further components may thus be limited in the deactivated mode of the information display, provided that these are not used in the deactivated mode of the information display. These components may be switched into a kind of standby mode so as to be available again as quickly as possible. The common sleep mode may be unsuitable for this purpose if it would cause the waking of the components when they are needed to last too long. Certain components also have to remain active, but these may possibly likewise be put into a low-energy mode, such as for example Ethernet, since the navigation system continues to run in the background in restricted form, that is to say without rendering the navigation data and providing it to the information display. In this case, vehicle positioning, generally by way of GPS, continues to be required. It should thus constantly be checked which components may be switched off, which ones may continue to be operated in a downgraded mode, for example by curtailing their power, and which components should continue to run at full power.

Up until now, when deactivating the information display, this was just switched to dark, so as to be immediately available again as soon as the vehicle user wishes to reactivate it.

One exemplary scenario was in this case as follows: the user drives out of a town and inputs a location in a further town as a destination in his navigation system. As soon as he has left the town and is on the highway, he knows the way to the destination town and accordingly switches off the information display. The vehicle function responsible for preparing navigation data continues to receive current GPS coordinates during the journey, while the information display is switched to dark, and continues to draw the current map data for example from a navigation map DVD or a hard drive internal to the vehicle. These data then continue to be prepared and transmitted to the GPU for rendering. The GPU accordingly renders the data and generally transfers them via a signal converter for depiction on the information display. In this case, a similar amount of energy is consumed as in the case if the information display were not to be switched to black.

The present invention applies to a central field of the infotainment system for the vehicle user. In this case, this is generally the information display. If this is not being used, it may be switched off, for example put into a standby mode, in order to save energy. However, since information no longer has to be depicted on the information display due to this, corresponding further functionalities, such as for example the GPU, may be curtailed or completely switched off. Furthermore, the CPU is also generally loaded to a lesser extent as a result, such that it is also able to be curtailed in terms of its power in order to be able to save even more electrical energy. In this case, however, it should continue to be ensured that a vehicle user receives that information that he may currently expect when the information display system is activated, and also receive it displayed immediately, without previous depictions first of all having to be overwritten and without the new information first of all having to be determined so as then to render it and then be able to depict it on the information display. To this end, for example, a graphic pipeline should be emptied and kept free so as to be filled immediately with the currently rendered information when needed, so that, when the information display is switched on again, it is possible to display no longer the previous information, but rather already the up-to-date information. To this end, those functions that continue to determine the constantly up-to-date specific information are kept active and kept in preparation for rendering. These are in particular the GPS system, corresponding information media, such as for example a DVD player or a hard disk (HDD) and the correspondingly required vehicle components that determine their specific information on the basis thereof and provide it in prepared form for rendering, so that this information is able to be retrieved immediately when needed.

The problem is thus that of identifying those system parts that are able to be kept turned off or in a low-energy mode or standby mode. And in the process, nevertheless, being able to keep the specific information required at the time of activation of the information display prepared and up to date, so that it is able to be depicted visually without a noticeable time delay on the information display when said information display is switched on again and the vehicle user is able to immediately read the currently required information.

The navigation data and display data are generally calculated in the LGA or in the SoC. The LGA may in this case comprise for example the CPU, GPU, digital sound processor, also called DSP, video encoder and video decoder and the like in terms of hardware.

The RAM may generally also be incorporated outside the SoC on the LGA.

In the deactivated mode of the information display, for example, the CPU may be limited from for example 1.9 GHz to about a third, to in this case about 600 MHz. As a result, the electric power consumption of the SoC is able to be curtailed from for example around 14 W to around 3 W, as a result of which a significant amount of electrical energy is able to be saved.

The GPU on the LGA may furthermore be completely switched off.

Nevertheless, the invention in this case makes it possible, in the deactivated mode of the information display, for example in this case to keep the navigation data and the radio station lists of digital radio and/or television stations updated, so as to be able to visually display them as quickly as possible when needed.

The present invention thus provides user-dependent load activation based on the information display.

In this case, the motor vehicle and/or its infotainment system may detect how the vehicle user is using this system and react accordingly. Examples of this are: Is Bluetooth/WLAN active? Is the display on/off? Is the entertainment system active/inactive/mute?

The unused components are switched off or put into a standby mode in order to save electrical energy. For example: Bluetooth/WLAN inactive→switch off component; no longer switch display to black when "off", but rather switch off.

As a result, a current consumption may be reduced by way of example from around 40 W for the infotainment system in the deactivated mode of the information display according to the invention to around 14 W.

The invention is explained in more detail below with reference to the figures.

DETAILED DESCRIPTION OF THE DRAWINGS

Figure 1:
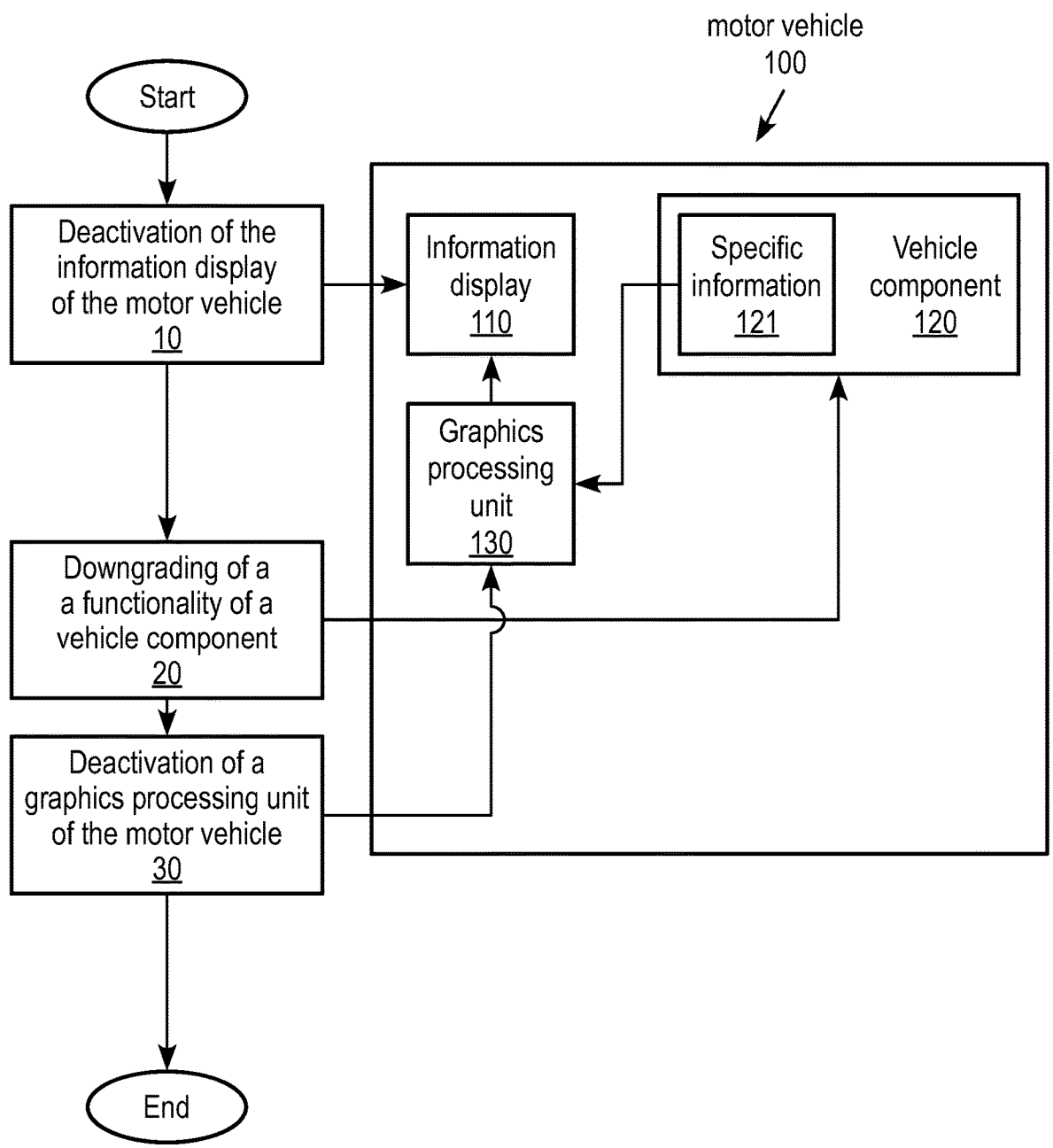
FIG. 1 shows a schematic illustration of a proposed method according to one exemplary configuration of the invention.

FIG. 1 shows a schematic illustration of a proposed method according to one exemplary configuration of the invention.

FIG. 1 in this case shows a schematic illustration of a method for an electrical low-energy operation of motor vehicle functions during the operation of a motor vehicle 100. In this case, the motor vehicle 100 comprises an information display 110. And the method in this case comprises: deactivating 10 the information display 110 of the motor vehicle 100. Downgrading 20 a functionality of at least one vehicle component 120 that the information display 110 uses to visually depict specific information 121 of the vehicle component 120. And, deactivating 30 a graphics processing unit 130 of the motor vehicle 100 as an energy-saving measure. In this case, the graphics processing unit 130 is configured so as to prepare the specific information 121 of the vehicle component 120 such that this information 121 is able to be depicted visually on the information display 110. And in this case, the functionality of the vehicle component 120 is downgraded 20 such that the vehicle component 120 continues to functionally determine its associated specific information 121 and retains it in preparation for a graphic processing operation.

Figure 2:
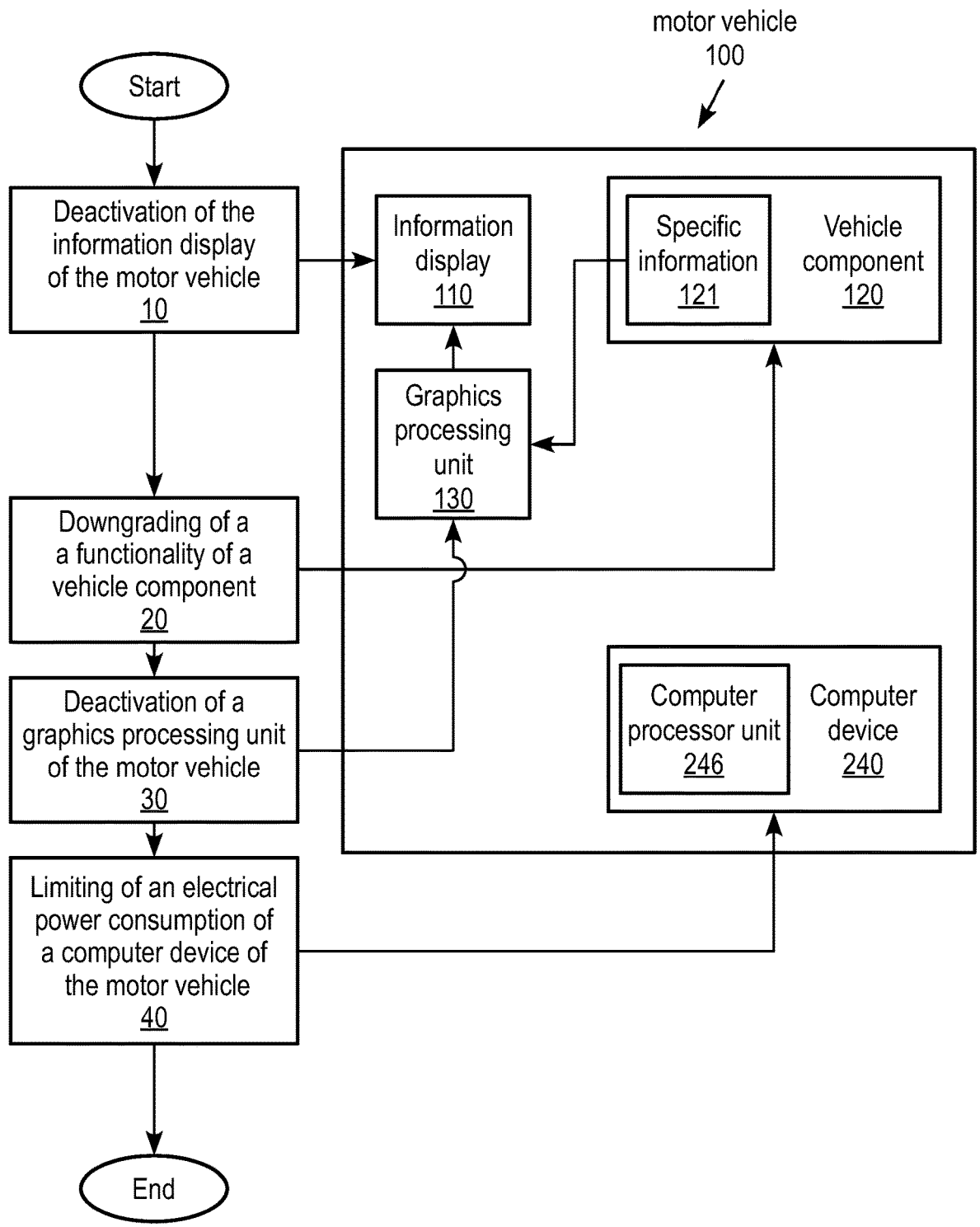
FIG. 2 shows a schematic illustration of a proposed method according to a further exemplary configuration of the invention.

FIG. 2 shows a schematic illustration of a proposed method according to a further exemplary configuration of the invention.

In this case, FIG. 2 shows a schematic illustration of a device that is developed further in relation to FIG. 1. What has been stated previously for FIG. 1 therefore also continues to apply to FIG. 2.

FIG. 2 shows the method from FIG. 1, in which the method furthermore comprises limiting 40 an electric power consumption of a computer device 240 of the motor vehicle 100 as a third energy-saving measure. This is performed such that a clock frequency of a computer processor unit 246 of the computer device 240 is curtailed by at least 50%, preferably by at least ⅔.

Figure 3:
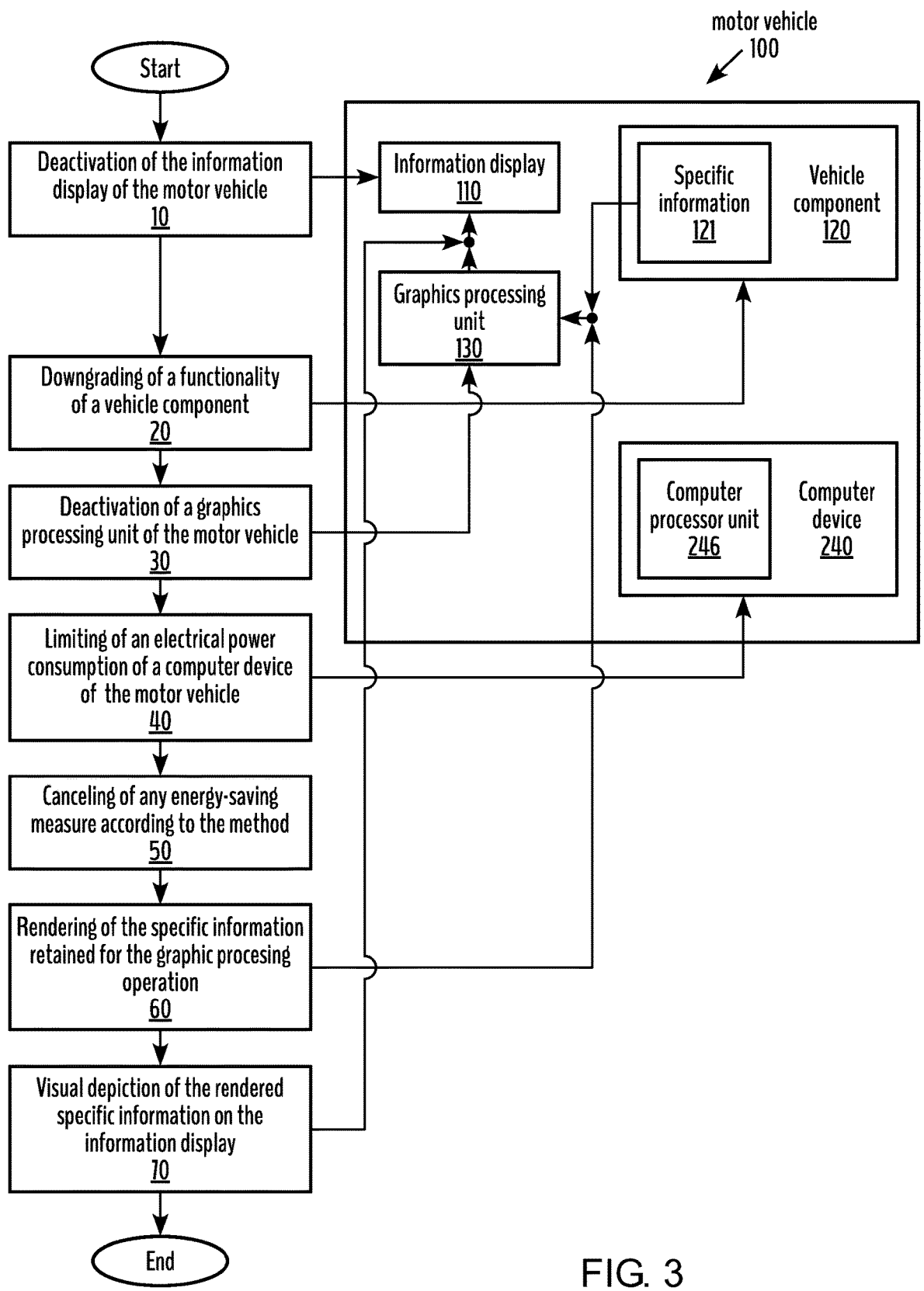
FIG. 3 shows a schematic illustration of a proposed method according to a further exemplary configuration of the invention.

FIG. 3 shows a schematic illustration of a proposed method according to a further exemplary configuration of the invention.

In this case, FIG. 3 shows a schematic illustration of a method developed further in relation to FIG. 1 and FIG. 2. What has been stated previously for FIG. 1 and FIG. 2 therefore also continues to apply to FIG. 3.

FIG. 3 shows the method from FIG. 2, in which the method, when the information display 110 is switched on again, furthermore comprises: canceling 50 any energy-saving measure according to the method. Rendering 60 the specific information 121 retained for the graphic processing operation. And, visually depicting 70 the rendered specific information 121 on the information display 110.

Figure 4:
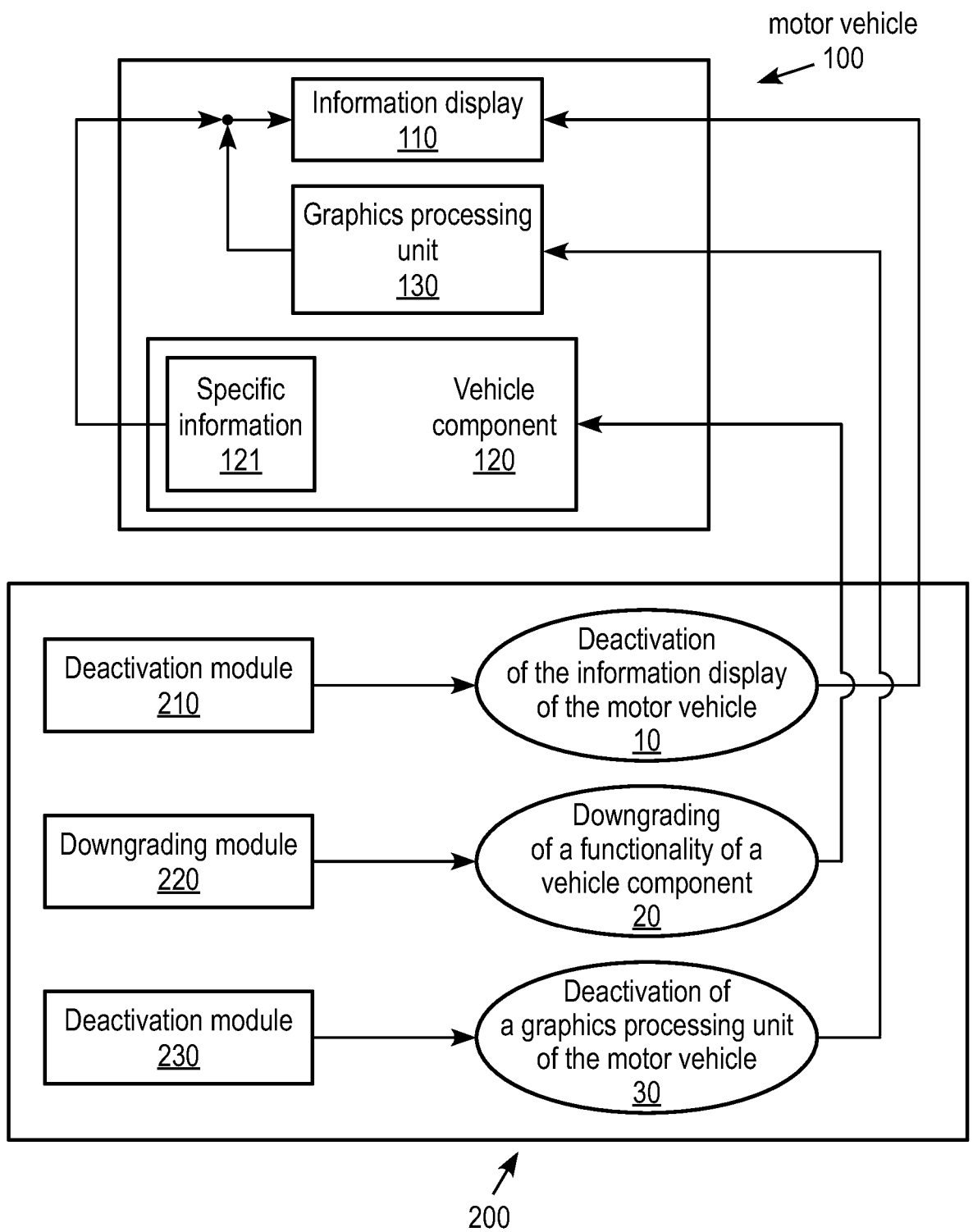
FIG. 4 shows a schematic illustration of a proposed device according to a further exemplary configuration of the invention.

FIG. 4 shows a schematic illustration of a proposed device according to a further exemplary configuration of the invention.

FIG. 4 shows a device 200 for an electrical low-energy operation of motor vehicle functions during the operation of a motor vehicle 100. In this case, the motor vehicle 100 comprises an information display 110. And in this case, the device 200 comprises: a deactivation module 210 for deactivating 10 the information display 110 of the motor vehicle 100. A downgrading module 220 for downgrading 20 a functionality of at least one vehicle component 120 that uses the information display 110 to visually depict specific information 121 of the vehicle component 120. And a deactivation module 230 for deactivating 30 a graphics processing unit 130 of the motor vehicle 100 as an energy-saving measure. In this case, the graphics processing unit 130 is configured so as to prepare the specific information 121 of the vehicle component 120 such that this information 121 is able to be depicted visually on the information display 110. And the device 200 is configured so as to execute a method according to the invention.

Figure 5:
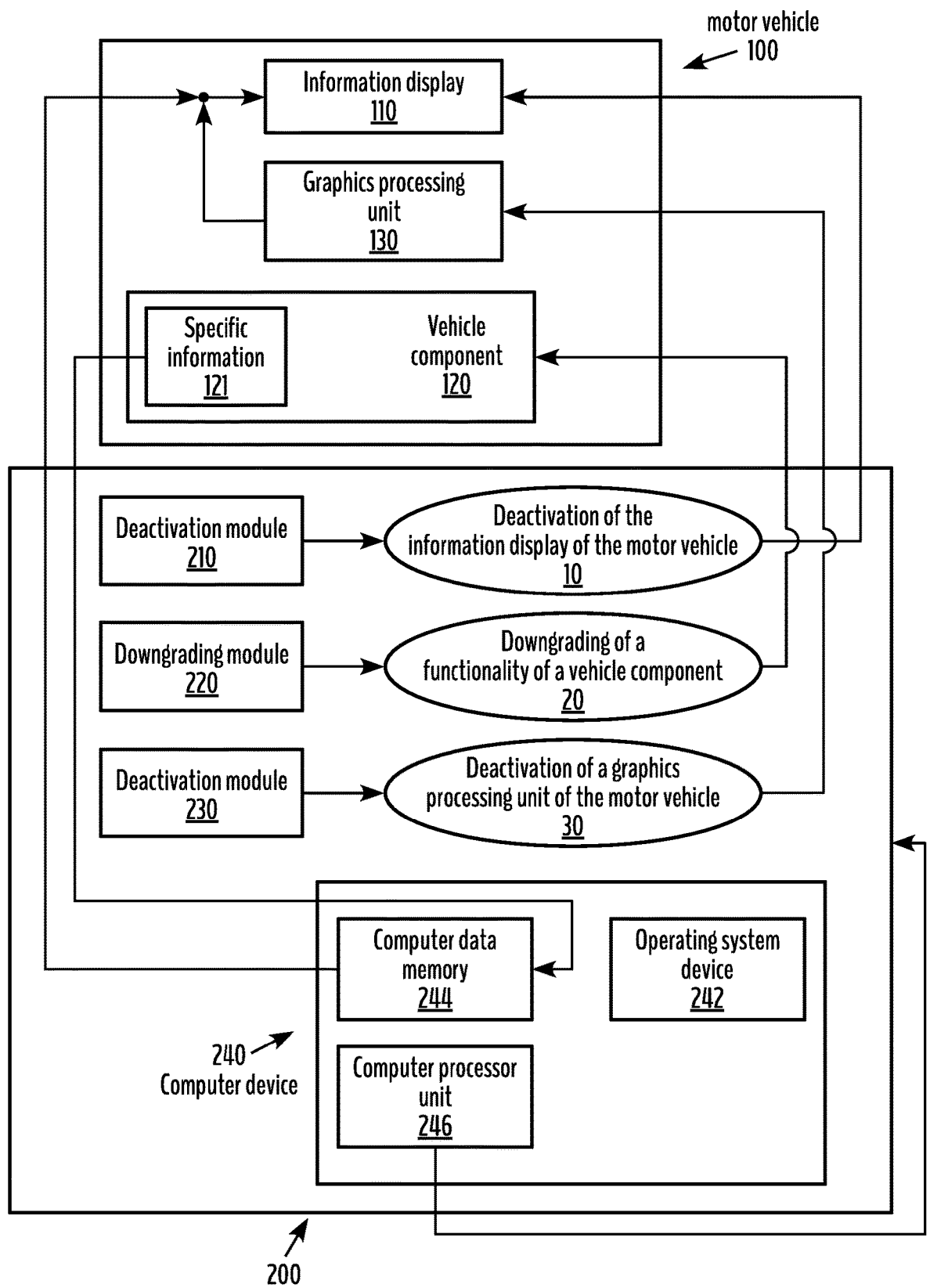
FIG. 5 shows a schematic illustration of a proposed device according to a further exemplary configuration of the invention.

FIG. 5 shows a schematic illustration of a proposed device according to a further exemplary configuration of the invention.

In this case, FIG. 5 shows a schematic illustration of a device developed further in relation to FIG. 4. What has been stated previously for FIG. 4 therefore also continues to apply to FIG. 5.

FIG. 5 shows the device of FIG. 4, in which the device 200 furthermore comprises a computer device 240. The computer device 240 in this case comprises an operating system device 242, a computer data memory 244 and a computer processor unit 246. In this case, the operating system device 242 comprises an operating system of the computer device 240. The computer data memory 244 is configured in this case so as to keep stored specific information 121 associated with the vehicle component 120 and preparated for a graphic processing operation. And the computer processor unit 246 is configured in this case so as to control the device 200.

Figure 6:
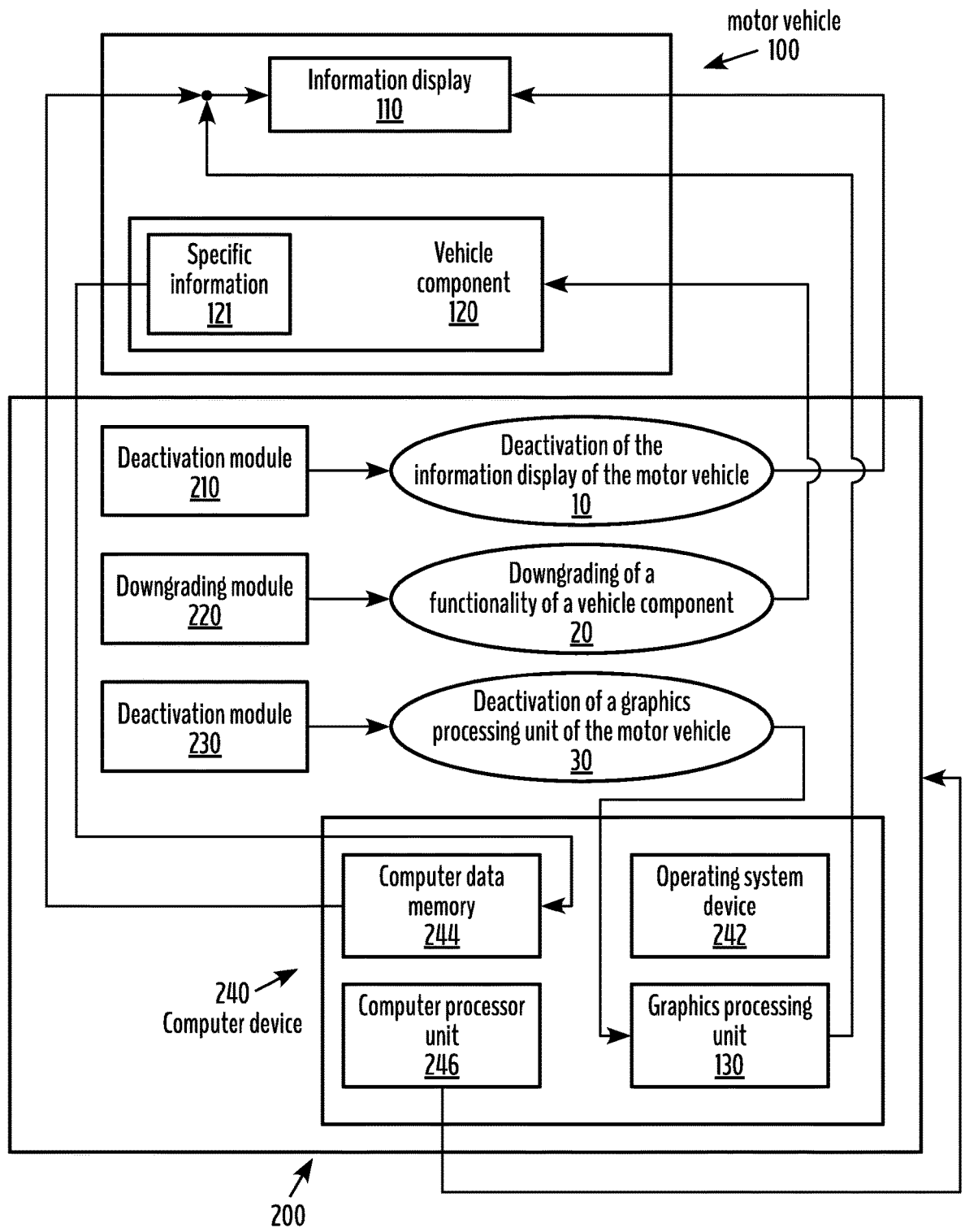
FIG. 6 shows a schematic illustration of a proposed device according to a further exemplary configuration of the invention.

FIG. 6 shows a schematic illustration of a proposed device according to a further exemplary configuration of the invention.

In this case, FIG. 6 shows a schematic illustration of a device developed further in relation to FIG. 4 and FIG. 5. What has been stated previously for FIG. 4 and FIG. 5 therefore also continues to apply to FIG. 6.

FIG. 6 shows the device of FIG. 5 in which the computer device 240 of the device 200 furthermore comprises the graphics processing unit 130 of the motor vehicle 100.

Figure 7:
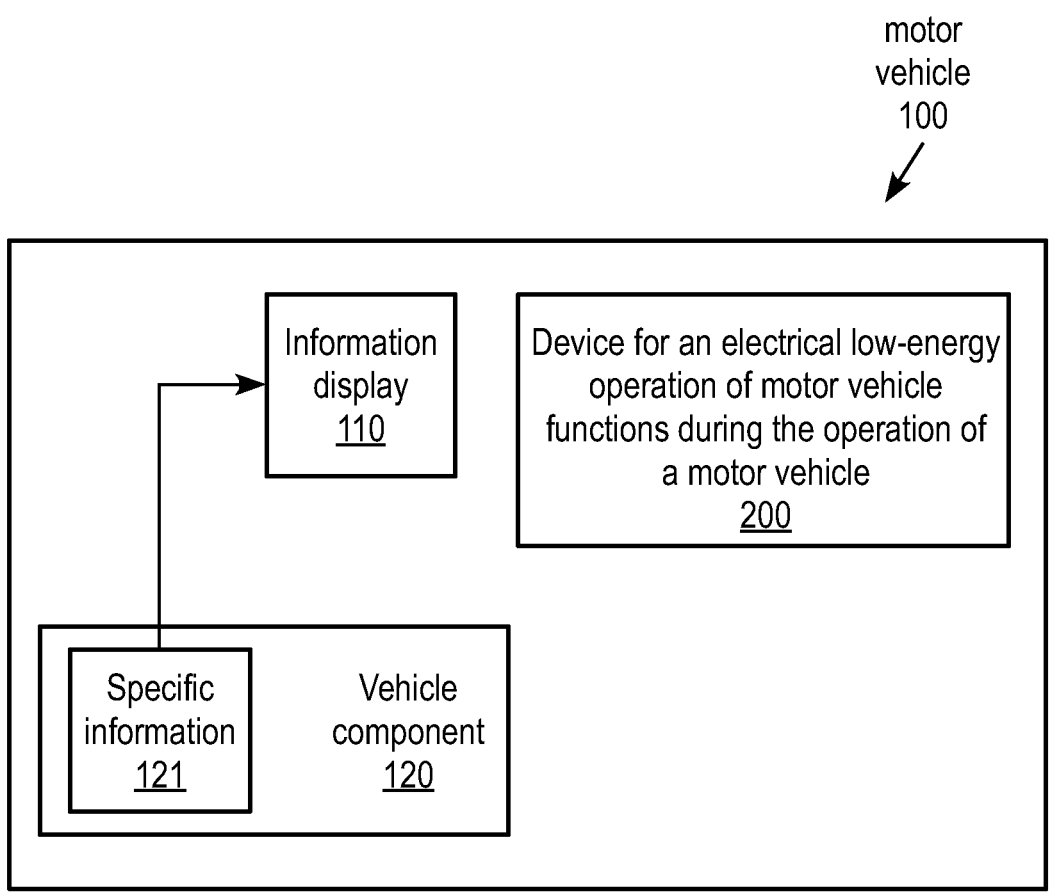
FIG. 7 shows a schematic illustration of a proposed motor vehicle according to a further exemplary configuration of the invention.

FIG. 7 shows a schematic illustration of a proposed motor vehicle according to a further exemplary configuration of the invention.

In this case, FIG. 7 shows a schematic illustration of a motor vehicle 100, comprising a vehicle component 120, wherein the vehicle component 120 is configured so as to provide specific information 121. The motor vehicle 100 furthermore comprises an information display 110, wherein the information display 110 is configured so as to graphically depict the specific information 121 of the vehicle component 120. And, the motor vehicle 100 furthermore comprises a device 200 according to the invention. And in this case, the motor vehicle 100 and/or the device 200 according to the invention are configured so as to execute a method according to the invention.

The invention may in this case be summarized as follows.

The invention is concerned with adjusting the performance and thus the energy consumption to the degree of use/the system usage of the head unit. By way of what is known as a "low-performance mode", the energy consumption is intended to be adjusted to the current load, that is to say specifically to the user situation.

This is achieved, on the one hand, in that, depending on particular user scenarios, individual unrequired electronic components inside the head unit are either switched off completely or switched into a special "reset mode" with particularly low energy consumption. The CPU/GPU unit is furthermore accordingly clocked at a lower rate, limited to an energy budget or entire blocks, such as for example the GPU, on the computer device, what is known as the system on chip (SoC) device, are switched off. An "energy-saving mode" is thus created that adjusts and thus reduces the overall energy consumption in a load-dependent manner.

The input variables in this case include all functions that are also able to be switched off by the user himself. A scenario that initiates the low-performance mode may be for example the user switching off the display.

The user scenarios are to this end continuously monitored by an "agent". This agent knows the instantaneous system load and is able to control the "low-performance mode" according to the user scenarios.

Positive effects are then seen in the increased range of E-vehicles and in the reduced $CO_2$ emissions in conventional vehicles.

LIST OF REFERENCE SIGNS 10 deactivation of the information display of the motor vehicle
20 downgrading of a functionality of a vehicle component
30 deactivation of a graphics processing unit of the motor vehicle
40 limiting of an electrical power consumption of a computer device of the motor vehicle
50 canceling of any energy-saving measure according to the method
60 rendering of the specific information retained for the graphic processing operation
70 visual depiction of the rendered specific information on the information display
100 motor vehicle
110 information display
120 vehicle component
121 specific information
130 graphics processing unit
200 device for an electrical low-energy operation of motor vehicle functions during the operation of a motor vehicle
210 deactivation module
220 downgrading module
230 deactivation module
240 computer device
242 operating system device
244 computer data memory
246 computer processor unit

What is claimed is:

1. A method for an electrical low-energy operation of motor vehicle functions during operation of a motor vehicle, wherein the motor vehicle comprises an information display, a computer device comprising a computer processor, and a vehicle component, the method comprising:
    deactivating, using the computer processor to execute a display deactivation module, the information display of the motor vehicle;
    downgrading, using the computer processor to execute a downgrading module, a functionality of the vehicle component that determines specific information and that the information display uses to visually depict the specific information of the vehicle component, wherein the vehicle component is distinct from the computer processor of the computer device of the motor vehicle; and
    deactivating, using the computer processor to execute a graphics processing unit deactivation module, a graphics processing unit of the motor vehicle as an energy-saving measure, wherein
       the graphics processing unit is configured so as to prepare the specific information transmitted from the vehicle component such that the specific information is able to be depicted visually on the information display, and
       the functionality of the vehicle component is downgraded such that the vehicle component continues to determine and retain the specific information in preparation for a graphic processing operation.

2. The method according to claim 1, wherein
the specific information is retained, in preparation for the graphic processing operation, such that the specific information is able to be rendered immediately for the visual depiction on the information display when needed.

3. The method according to claim 1, wherein
the vehicle component comprises a navigation device, and the specific information comprises navigation map information.

4. The method according to claim 1, wherein
the vehicle component comprises a radio transmitter device, and the specific information comprises radio station information.

5. The method according to claim 1, wherein
downgrading the functionality of the vehicle component comprises limiting an electric power consumption of the vehicle component as a second energy-saving measure.

6. The method according to claim 5, wherein
limiting the electric power consumption of the vehicle component comprises a limitation of at least 50% of the electric power consumption of normal operation of the vehicle component.

7. The method according to claim 5, further comprising:
limiting an electric power consumption of the computer device of the motor vehicle as a third energy-saving measure such that a clock frequency of the computer processor of the computer device is curtailed by at least 50%.

8. The method according to claim 7, wherein
when the information display is switched on again, the method further comprises:
    canceling any energy-saving measure;
    rendering the specific information retained for the graphic processing operation; and
    visually depicting the rendered specific information on the information display.

9. The method according to claim 1, wherein
each energy-saving measure is designed to be unnoticeable by a user of the motor vehicle.

10. A device for an electrical low-energy operation of motor vehicle functions during operation of a motor vehicle, wherein the motor vehicle comprises an information display, the device comprising:
    a computer processor to control the device and to execute:
       an information display deactivation module to deactivate the information display of the motor vehicle;
       a downgrading module to downgrade a functionality of at least one vehicle component that determines specific information and that the information display uses to visually depict the specific information of the vehicle component, wherein
          the vehicle component is distinct from the computer processor; and
       a graphics processing unit deactivation module to deactivate a graphics processing unit of the motor vehicle as an energy-saving measure, wherein
          the graphics processing unit is configured so as to prepare the specific information transmitted from the vehicle component such that the specific information is able to be depicted visually on the information display, wherein
          the device is configured to execute a method of:

deactivating, via the information display activation module, the information display of the motor vehicle;

downgrading, via the downgrading module, the functionality of at least one vehicle component that the information display uses to visually depict the specific information of the vehicle component; and deactivating, via the graphics processing unit deactivation module, the graphics processing unit of the motor vehicle as an energy-saving measure, wherein the functionality of the at least one vehicle component is downgraded such that the vehicle component continues to functionally determine and retain the specific information in preparation for a graphic processing operation.

11. The device according to claim 10, further comprising:
an operating system device, and
a computer data memory, wherein
the operating system device comprises an operating system of the computer device, and
the computer data memory is configured so as to keep stored the specific information associated with the vehicle component and prepared for the graphic processing operation.

12. The device according to claim 11, wherein
the device further comprises the graphics processing unit of the vehicle.

13. The device according to claim 10, wherein the downgrading the functionality of the vehicle component comprises:
limiting an electric power consumption of the vehicle component.

14. The device according to claim 10, wherein the device is further configured to execute a method of:
in response to the deactivation of the information display, removing information from a graphic pipeline of the graphics processing unit and/or preventing new information from being added to the graphic pipeline of the graphics processing unit.

15. The device according to claim 10, wherein the downgrading module is configured to downgrade only the vehicle component.

16. The device according to claim 10, wherein the method the device is configured to execute further comprises:
analyzing which of a plurality of functions of the functionality of the vehicle component should currently be used and to what extent, wherein
the downgrading of the functionality of the vehicle component is based on the analyzing.

17. The device according to claim 16, wherein the method the device is configured to execute further comprises:
curtailing the functions of the functionality of the vehicle component still being used according to a usage requirement.

18. A motor vehicle, comprising:
a vehicle component configured to provide a functionality that determines specific information;
an information display configured to graphically depict the specific information of the vehicle component; and
a device for an electrical low-energy operation of motor vehicle functions during operation of the motor vehicle, the device comprising:
a computer processor to control the device and to execute:

an information display deactivation module configured to deactivate the information display of the motor vehicle;

a downgrading module configured to downgrade the functionality of the vehicle component that the information display uses to visually depict the specific information of the vehicle component, wherein
the vehicle component is distinct from the computer processor of a computer device of the motor vehicle; and a graphics processing unit deactivation module configured to deactivate a graphics processing unit of the motor vehicle as an energy-saving measure, wherein
the graphics processing unit is configured to prepare the specific information transmitted from the vehicle component such that the specific information is able to be depicted visually on the information display, wherein
the device is configured to execute a method of:
deactivating, via the information display deactivation module, the information display of the motor vehicle;

downgrading, via the downgrading module, the functionality of the vehicle component that the information display uses to visually depict specific information of the vehicle component; and deactivating, via the graphics processing unit deactivation module, the graphics processing unit of the motor vehicle as an energy-saving measure, wherein
the functionality of the at least one vehicle component is downgraded such that the vehicle component continues to determine and retain the specific information in preparation for a graphic processing operation.

19. A computer product comprising a non-transitory computer readable medium having stored thereon program code that, when executed by a computer processor, carries out the acts of:
deactivating, using the computer processor to execute a display deactivation module, an information display of the motor vehicle;

downgrading, using the computer processor to execute a downgrading module, a functionality of at least one vehicle component that determines specific information and that the information display uses to visually depict the specific information of the vehicle component, wherein
the vehicle component is distinct from the computer processor; and deactivating, using the computer processor to execute a graphics processing unit deactivation module, a graphics processing unit of the motor vehicle as an energy-saving measure, wherein
the graphics processing unit is configured so as to prepare the specific information transmitted from the vehicle component such that the specific information is able to be depicted visually on the information display, and
the functionality of the at least one vehicle component is downgraded such that the vehicle component continues to determine and retain the specific information in preparation for a graphic processing operation.

* * * * *